United States Patent [19]

Nylund

[11] Patent Number: 4,911,308

[45] Date of Patent: Mar. 27, 1990

[54] MOBILE PLATE STAND

[75] Inventor: Knut H. Nylund, Mora, Sweden

[73] Assignee: Saxvikens Mat AB, Mora, Sweden

[21] Appl. No.: 268,006

[22] Filed: Nov. 7, 1988

[51] Int. Cl.$^4$ .............................................. A47F 7/00
[52] U.S. Cl. ...................................... 211/41; 211/71; 211/175
[58] Field of Search .................... 211/41, 71, 189, 205, 211/181, 175

[56] References Cited

U.S. PATENT DOCUMENTS

| | | | |
|---|---|---|---|
| 563,562 | 7/1896 | Burns | 211/71 |
| 887,401 | 5/1908 | Klotz | 211/181 X |
| 941,653 | 11/1909 | Rothengatter | 211/41 |
| 953,007 | 3/1910 | Haller | 211/71 |
| 1,104,970 | 7/1914 | Dean | 211/181 X |
| 1,888,141 | 11/1932 | Orth | 211/41 |
| 2,746,882 | 5/1956 | Hamal | 211/41 X |

FOREIGN PATENT DOCUMENTS 340490 12/1930 United Kingdom ................... 211/41

Primary Examiner—Robert W. Gibson, Jr.
Attorney, Agent, or Firm—Marshall & Melhorn

[57] ABSTRACT

A mobile stand for carrying and transporting a plurality of plates, especially with ready-to-eat meals arranged thereon, comprises a frame provided with wheels to roll on a base. On the frame, four parallel elongate rods extend upwardly and are mounted such that they can be displaced both towards and away from and in parallel with the center axis (C) of the stand. On each rod a plurality of V-shaped elements are mounted whose two projecting legs form carrying members for the plates. Since the rods are displaceably mounted, the distance between two legs located at the same level, but pertaining to separate V elements, can be adjusted to fit plates of different sizes.

The plate stand according to the invention enables the restaurant staff to work in a highly rational and convenient manner, whereby large orders, lunch crowds etc. can be readily managed. The plate stand is also conveniently used for taking away the empty plates to be washed.

6 Claims, 2 Drawing Sheets

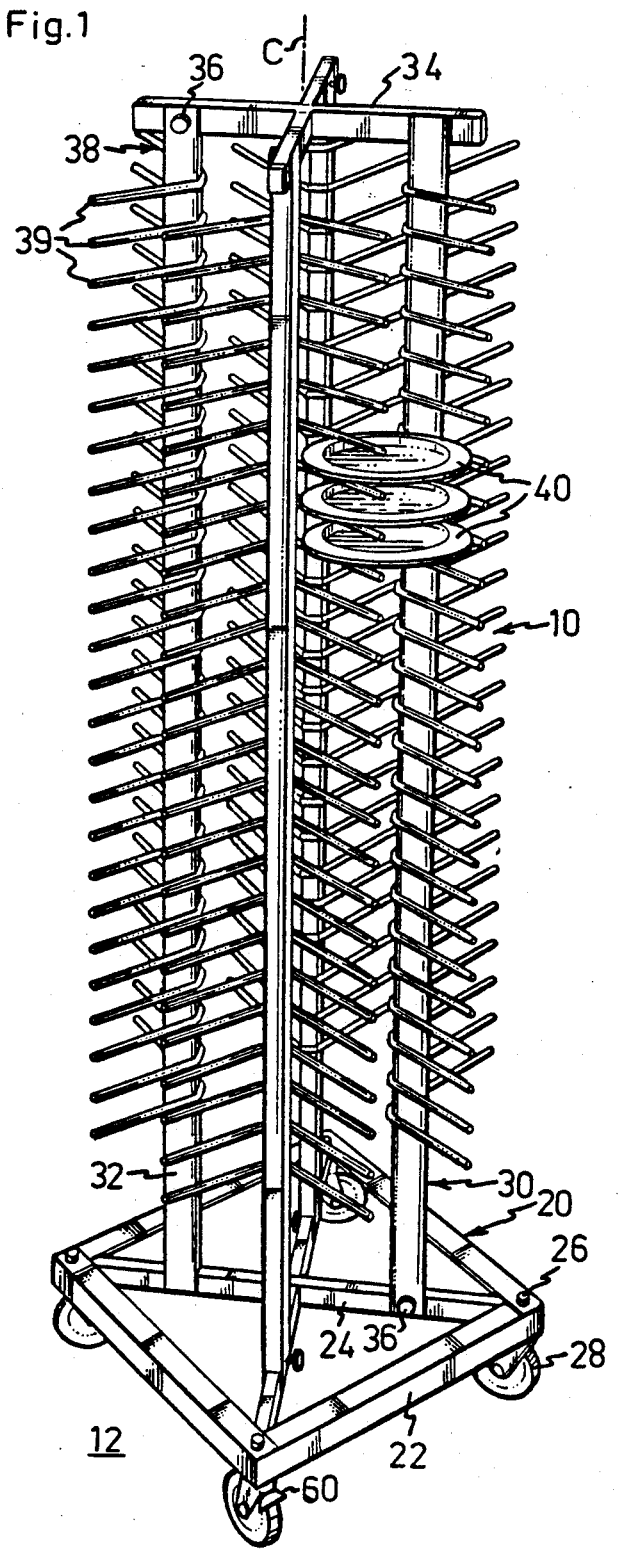

MOBILE PLATE STAND

BACKGROUND OF THE INVENTION

The present invention relates to a mobile plate stand for carrying and transporting a plurality of plates, especially with ready-to-eat meals arranged thereon.

In restaurants and other eating places catering for large numbers of guests, carrying plates with different orders is a great strain on the staff. Even in very big restaurants, all serving is surprisingly often done completely manually, the restaurant staff carrying three, four or maybe five plates at the utmost. Particularly during rush-hours and with large orders, this is hard and strenuous work causing a lot of running about which the guests may find annoying.

To date, the solution to this problem has been the so-called food trolley which is rolled into the restaurant carrying a number of plates. In general, such trolleys have a very low capacity, i.e. they normally have only two superposed and spaced-apart surfaces for carrying the plates. When there is food on each plate, the plates can of course not be superposed, and therefore only some ten plates at a time can be placed on a trolley of this type. There is thus a need for a mobile plate stand by means of which a large number of food-carrying plates can be conveniently moved about in restaurants etc.

One object of the present invention is therefore to provide a mobile plate stand by means of which a much larger number of plates than has been possible till now can be carried in a spaced-apart manner.

A further object is to provide a plate stand which can be easily adapted to plates of different sizes.

A still further object is to provide a service stand which comprises but a few, readily mounted components, thus making it possible to keep the production costs down.

Another object is to provide a plate stand which can be easily rolled also on slightly uneven floors and, furthermore, can be braked when desired.

BRIEF DESCRIPTION OF THE INVENTION

The present invention is intended to eliminate the drawbacks discussed above and to achieve the above-mentioned objects. To this end, the invention provides a mobile plate stand for carrying and transporting a plurality of plates, especially with ready-to-eat meals arranged thereon. The plate stand comprises a frame which is provided with wheels to roll on a base, and a supporting means mounted on the frame and extending upwardly therefrom. On the supporting means, plate-carrying members are mounted in a spaced-apart relationship and extend substantially at right angles to the supporting means. Moreover, the plate stand according to the invention comprises means for adjusting the distance between the carrying members to fit plates of different sizes.

According to an embodiment of the invention, the supporting means comprises four parallel elongate and upwardly extending rods mounted on the frame and provided with adjusting means which allow parallel movement of the rods both towards and away from the center axis of the supporting means. The plate-carrying members are substantially V-shaped, equidistantly spaced-apart elements, each of which is fixedly mounted on the respective rod with its tip directed towards the center axis and with its two legs directed away from the center axis. Each plate is carried by two legs, each of which is part of a V-shaped element at the same level.

The inventive plate stand brings a number of advantages, some of which will be mentioned below. For example, the plate stand makes it possible to plan in advance for the lunch rush-hour by preparing vegetable plates etc. which are placed in the stand and then can be rolled into the restaurant carrying, say, a hundred plates at a time. The restaurant staff will thus have a smoother working rhythm, suffer from less stress and, probably, get more pleasure out of their work. The plate stand is also most useful for collecting the empty plates. The entire stand can be filled with empty plates and then conveniently rolled to a dishwasher. The plate stand can, of course, also be used for storing washed pot-lids, food receptacles etc.

BRIEF DESCRIPTION OF THE DRAWINGS

The invention will now be described in detail with reference to the accompanying drawings.

FIG. 1 is a perspective view of a plate stand according to an embodiment of the invention;

DETAILED DESCRIPTION OF AN EMBODIMENT OF THE INVENTION

Figure 4:
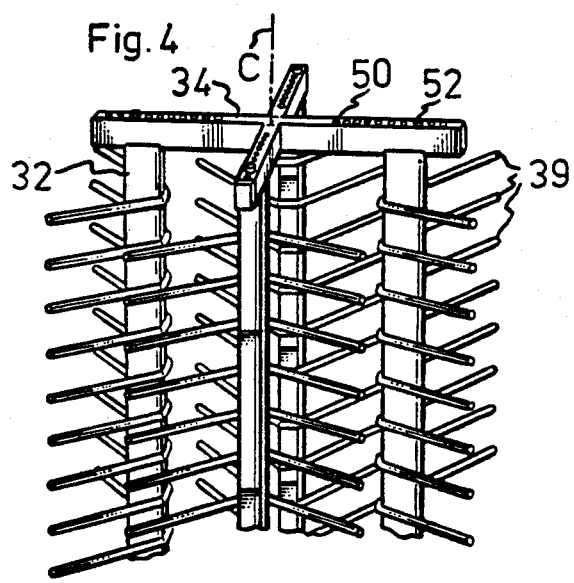
FIG. 4 is a perspective view of the upper portion of the stand, showing a variant of the adjusting means.

FIG. 1 shows an inventive plate stand which is generally designated 10 and comprises two main components, viz. a wheel-mounted frame designated 20, and an upright supporting means 30 mounted on the frame. The plate stand 10 can be moved on a base 12, such as the floor in a restaurant.

The frame 20 has the shape of a square frame 22 consisting of four beams which are L-shaped in cross-section. Inside the frame 20, a first cross-shaped element 24 is mounted by means of bolts 26 positioned in each corner of the frame 22 and preferably also forming the pivot axes of four caster wheels 28.

The supporting means 30 comprises four rods 32 connected at their lower end with the diagonal parts of the cross-shaped element 24 which preferably are of rectangular cross-section. The upper ends of the rods 32 are connected with a second cross-shaped element 34 aligned with the cross-shaped element 24 of the frame 20. The points of intersection of the two cross-shaped elements 24, 34 are coincident with the center axis C of the plate stand 10. The rods 32 are displaceable in parallel with each other both towards and away from the center axis C, while being supported by the two cross-shaped elements 24, 34. Thus, the rods 32 are displaceable along the diagonal parts of the two cross-shaped elements 24, 34 and can each be fixed separately in desired positions by bolts 36.

On each rod 32, a plurality of V-shaped elements 38 are mounted with their lip directed towards the center axis C. Each V element 38 thus has two legs 39 which are directed away from the respective rod 32 and preferably extend perpendicular to each other. The legs 39 serve as members for carrying plates 40. In order not to make FIG. 1 overly complex, only three plates 40 are shown, but the plate stand 10 according to the invention can hold in all a hundred plates 40.

Figure 2:
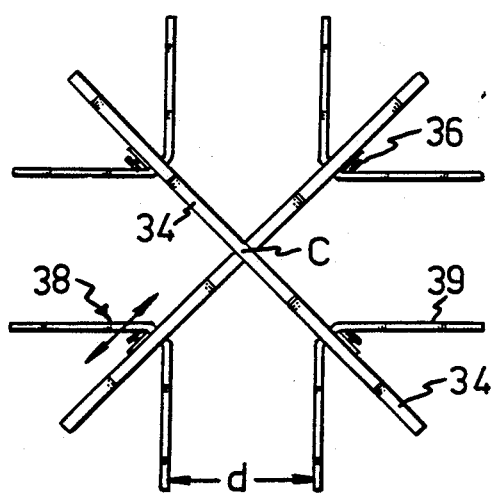
FIG. 2 is a top plan view of the plate stand in which some parts are removed to show the adjusting means.
Figure 3:
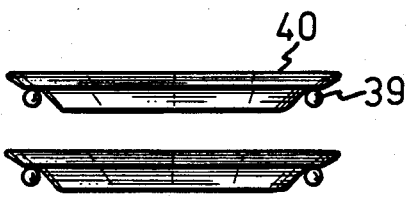
FIG. 3 is a front view of a slightly larger scale, showing how two plates are carried.

Each plate 40 is thus carried by two parallel projecting legs 39 which are each part of a V element 38 associated with a respective rod 32, as is best shown in FIGS. 2 and 3. Since the rods 32 are displaceably mounted on the two cross-shaped elements 24, 34 (see the arrow in FIG. 2), the distanced between the V elements 38 can be adjusted as required to fit plates 40 of different sizes. Adjustment is easily carried out by loosening the bolts 36, whereupon the rods 32 are moved in parallel with each other to the desired position in which they are secured again by the bolts 36. In a variant (not shown), also the vertical distance between the carrying members, i.e. the legs 39, can be adjusted.

FIG. 4 shows an alternative embodiment for setting the rods 32 in different positions in parallel with the center axis C of the plate stand 10. In this variant, the cross-shaped element 34 has a plurality of through-holes 50 into each of which a screw 52 is insertable for engagement with a corresponding thread (not shown) in the upper end of the respective rod 32. To adjust the rods 32, the screws 52 are loosened, whereupon the rods 32 are moved to the desired position and the screws 52 are tightened anew to clamp the respective rod 22.

The mobile plate stand 10 according to the invention is used in the following manner. Plates 40, optionally with ready-to-eat meals arranged thereon, are placed in the stand 10 and carried in a spaced-apart manner by carrying elements in the form of the projecting legs of the V elements 38 mounted on the rods 32. In the embodiment described above, a hundred plates 40 can be carried at a time. The plate stand 10 is then rolled into the dining-room, and the plates 40 are set on the tables. To keep the stand 10 steady while unloading the plates, at least two of the caster wheels 28 are provided with a disengagable brake 60 which is of prior art type and shown only schematically in FIG. 1.

After the meal, the empty plates 40 are placed in the stand 10 which is then rolled out of the dining-room. Handling of the plate stand 10 thus is extremely easy, and serving can be carried out promptly and effortlessly.

The invention is in no way restricted to the embodiments described above but can be modified in various ways within the scope of the invention as defined by the appended claims. For example, the parallel movement and fixation of the rods can be accomplished in some other manner by telescoping means (not shown) or the like. Furthermore, the stand can be used for carrying and transporting other objects, e.g. pot-lids, as indicated in the introductory part of the specification. The number of rods is also not restricted to four, and three, five or more rods may also be used.

What is claimed is:

1. A mobile plate stand for carrying and transporting a plurality of plates, espcially with ready-to-eat meals arranged thereon, comprising:
   (a) a frame provided with wheels to roll on a base,
   (b) a supporting means mounted on said frame and extending upwardly therefrom and having a center axis,
   (c) carrying members arranged on said supporting means and spaced apart for carrying plates in a spaced-apart relationship, said members extending away from said supporting means substantially at right angles to the center axis thereof, and
   (d) means for adjusting the distance between said carrying members to accommodate plates of different sizes.

2. The plate stand as claimed in claim 1, wherein said supporting means comprises at least three rods which are elongate and extend upwardly and in parallel with each other and which are mounted on said frame by adjusting means allowing parallel movement of said rods both towards and away from the center axis of said supporting means, said carrying members consisting of V-shaped, equidistantly spaced-apart elements mounted on the respective rod, the V-shaped elements having a tip portion directed towards the center axis of said supporting means and two legs directed away therefrom.

3. The plate stand as claimed in claim 2, wherein the ends of said rods facing away from said frame are connected to a cross-shaped element having a point of intersection coincident with the center axis of said supporting means and supportingly interconnected to the upper ends of said rods and including adjusting means allowing parallel movement of said rods both towards and away from the center axis of said supporting means.

4. The plate stand as claimed in claim 3, wherein said frame includes a cross-shaped element whose point of intersection is coincident with the center axis of said supporting means, said rods having means cooperating with said two cross-shaped elements for fixing said rods in different positions with regard to the center axis so as to obtain the desired distance between said carrying members according to the size of the plates.

5. The plate stand as claimed in claim 2, wherein the legs of each of said V-elements extend substantially perpendicular to each other.

6. The plate stand as claimed in claim 1, wherein said frame comprises four caster wheels of which at least two are provided with a disengageable brake.

* * * * *